United States Patent [19]

Hirahara et al.

[11] 4,023,477
[45] May 17, 1977

[54] FLEXIBLE CABLE DRY PEELER WITH RUBBER-LIKE CORDS

[75] Inventors: Katsuji Hirahara, Santa Clara; John R. Webber, Jr., San Jose, both of Calif.

[73] Assignee: FMC Corporation, San Jose, Calif.

[22] Filed: Sept. 29, 1975

[21] Appl. No.: 617,877

[52] U.S. Cl. .................... 99/585; 99/586; 99/587; 99/630
[51] Int. Cl.² .................... A23N 7/00; A47J 17/00
[58] Field of Search ............ 99/584, 623, 626, 627, 99/629, 630; 426/481, 482, 483; 403/252, 254, 291; 51/164

[56] References Cited

UNITED STATES PATENTS

| 3,192,974 | 7/1965 | Hickey et al. | 99/627 |
| 3,248,138 | 4/1966 | Bradbury | 403/291 |
| 3,811,000 | 5/1974 | Lazzarini | 426/483 |
| 3,854,395 | 12/1976 | Hirahara | 99/624 X |

FOREIGN PATENTS OR APPLICATIONS

| 1,145,092 | 10/1957 | France | 99/630 |
| 1,084,805 | 1/1955 | France | 403/252 |

*Primary Examiner*—Harvey C. Hornsby
*Assistant Examiner*—Robert Pous
*Attorney, Agent, or Firm*—C. E. Tripp

[57] ABSTRACT

A dry peeler for fleshy fruit is formed as a rotating cage having an annular helical conveyor with axially extending, circumferentially spaced neoprene peeling cords 3/8 inch in diameter stretched between adjacent convolutions of the helical conveyor. A neoprene stabilizing cable is tied to the mid portions of the peeling cords, which cable can surround all cords or can be threaded to pass inside and outside of selected peeling cords for increasing the aggressiveness of the peeling action.

10 Claims, 12 Drawing Figures

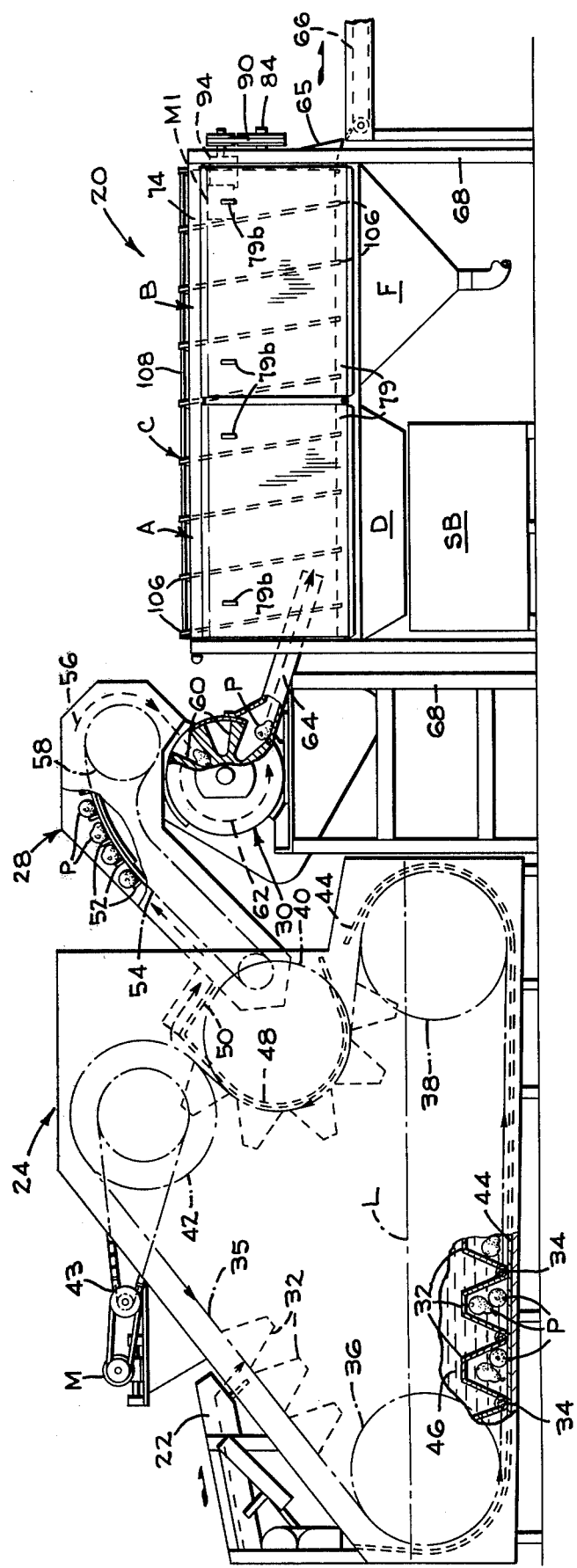
FIG_1

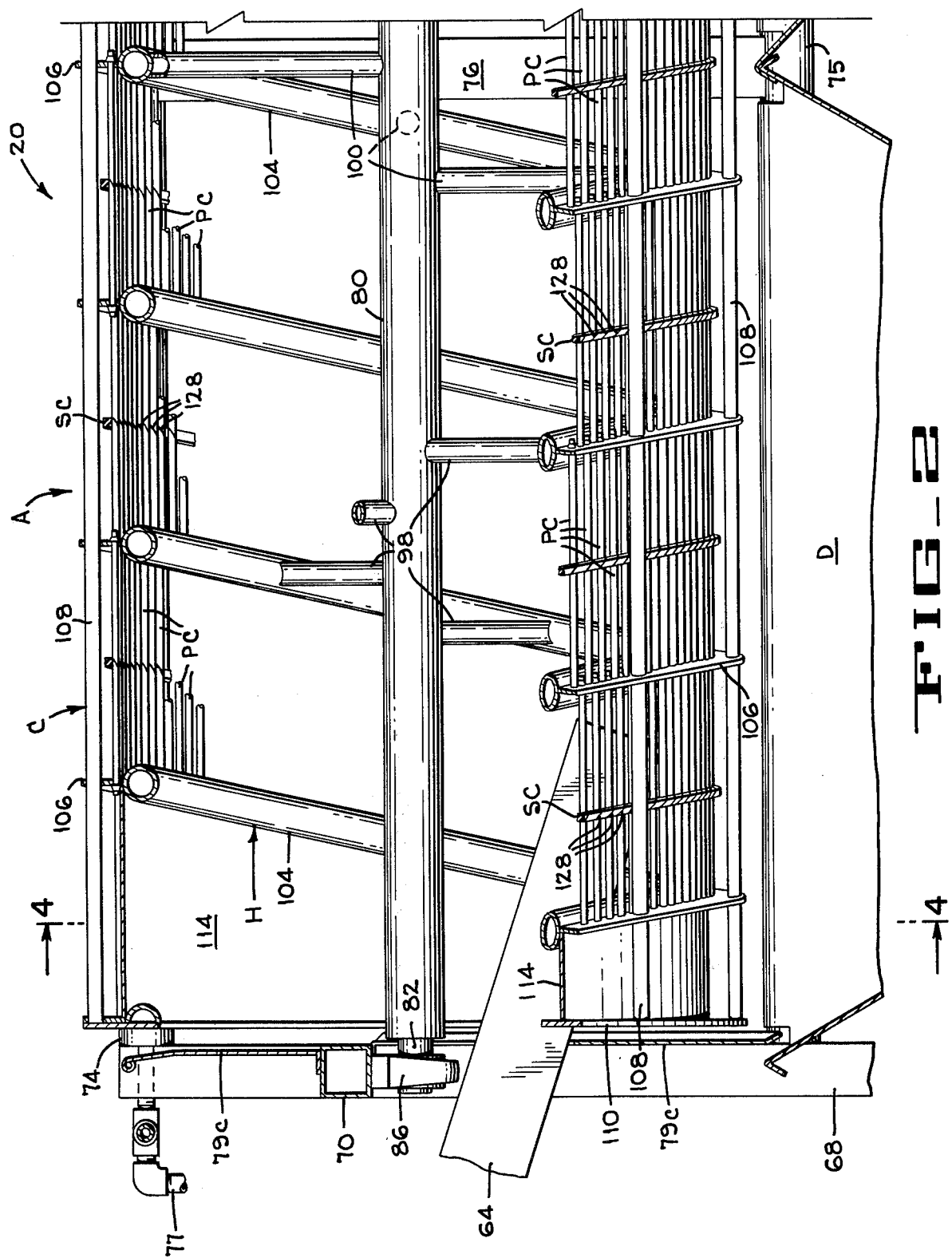
FIG_2

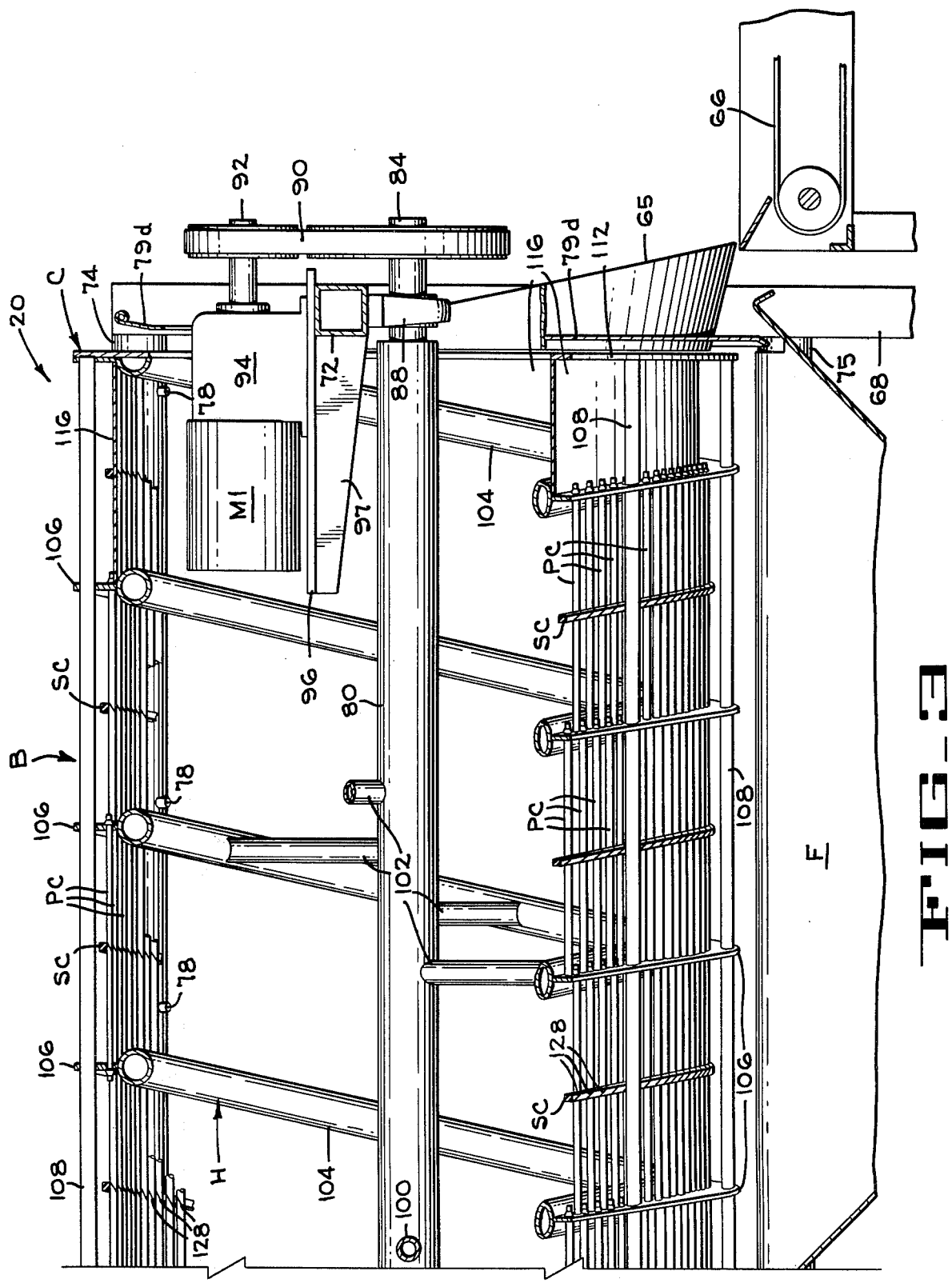

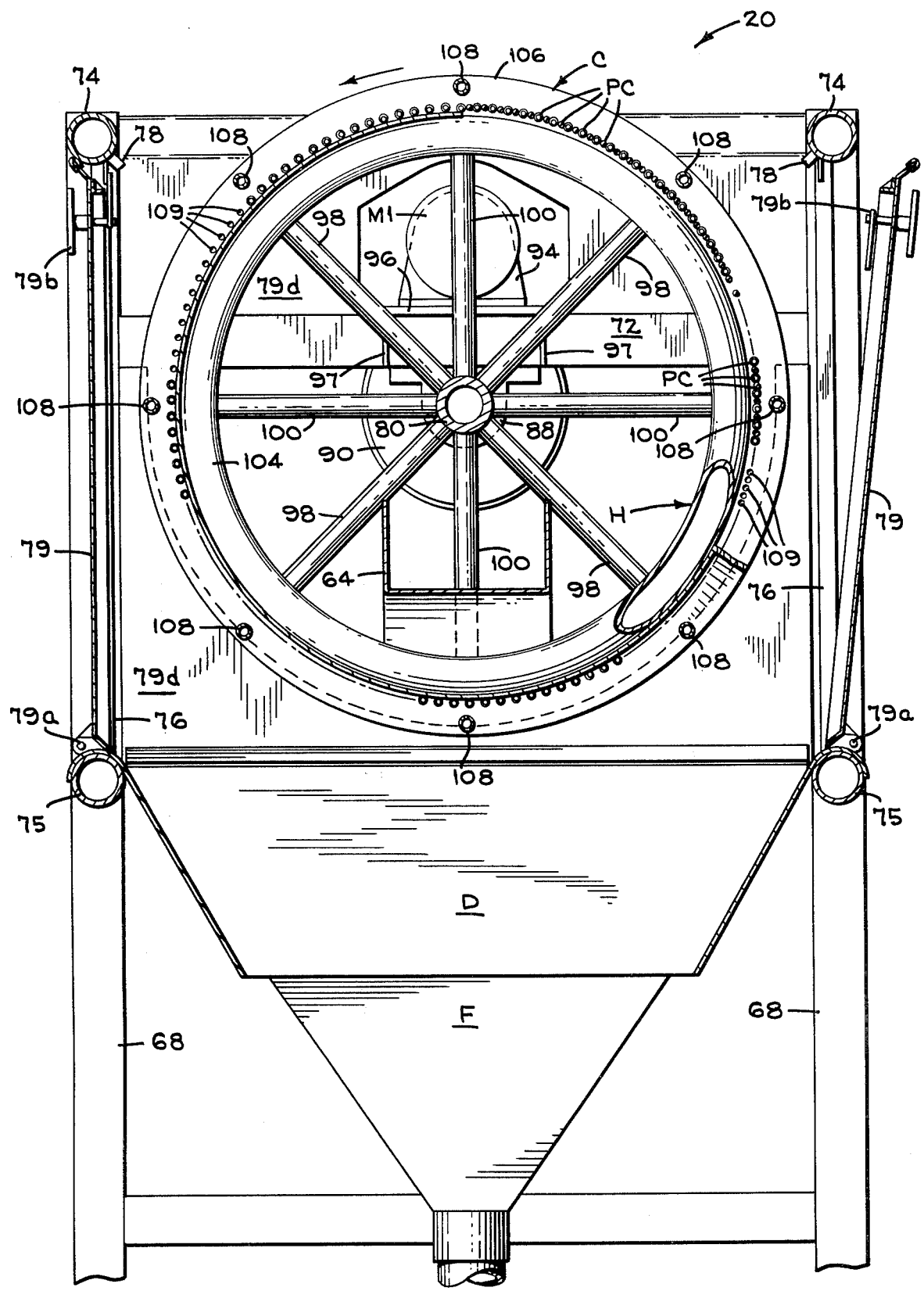

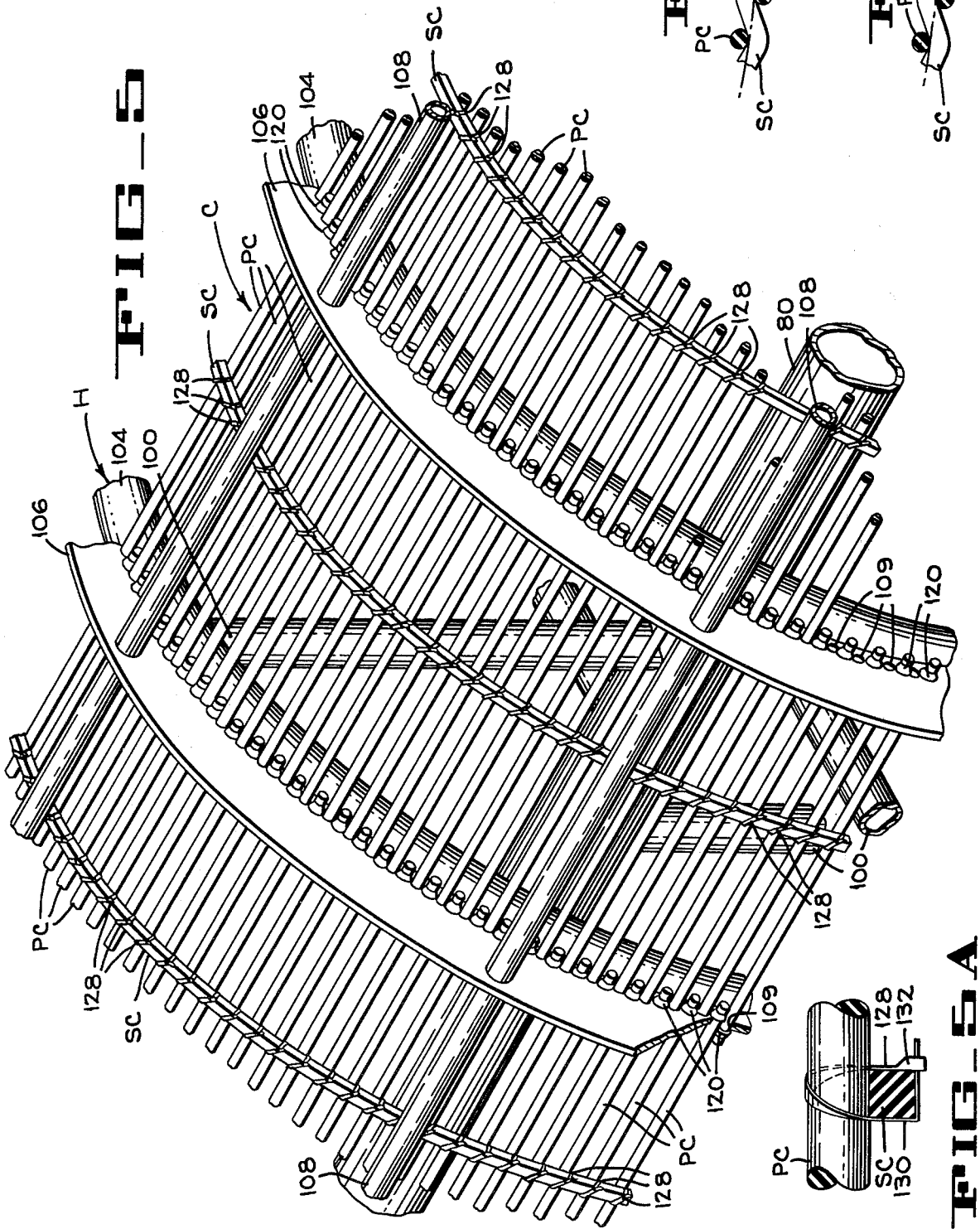

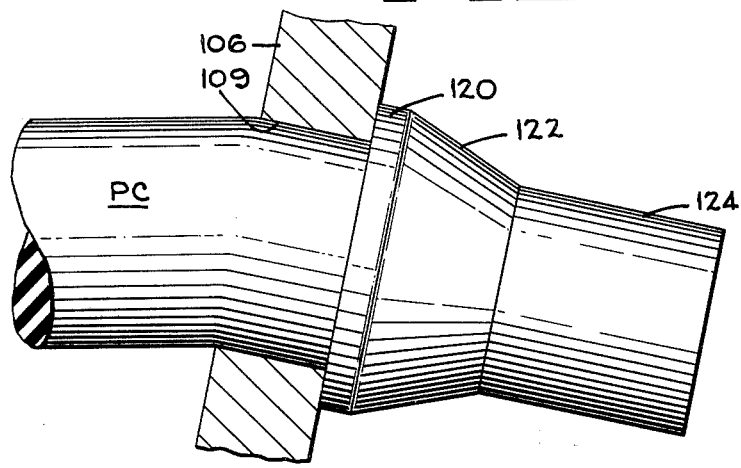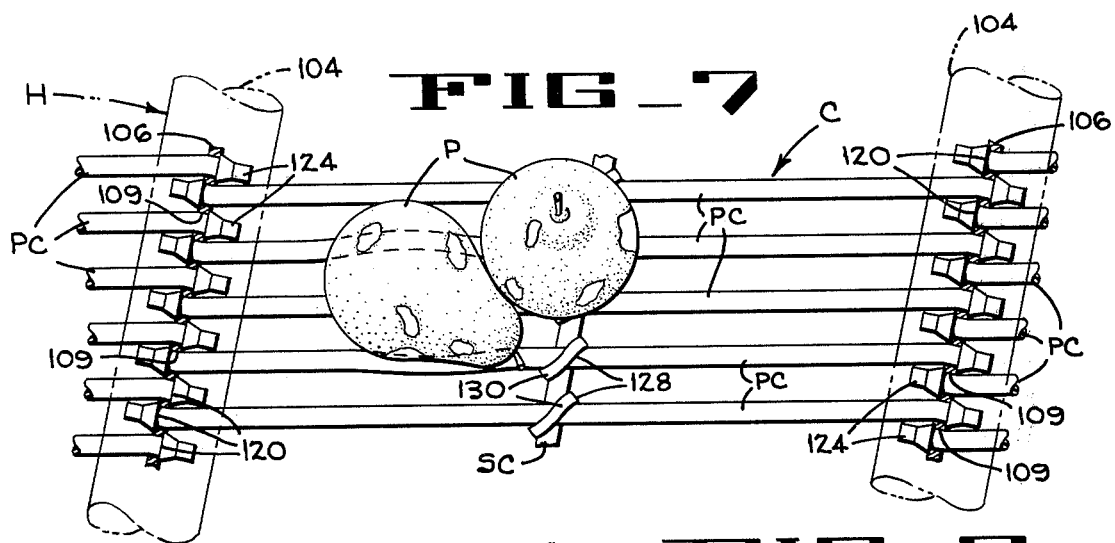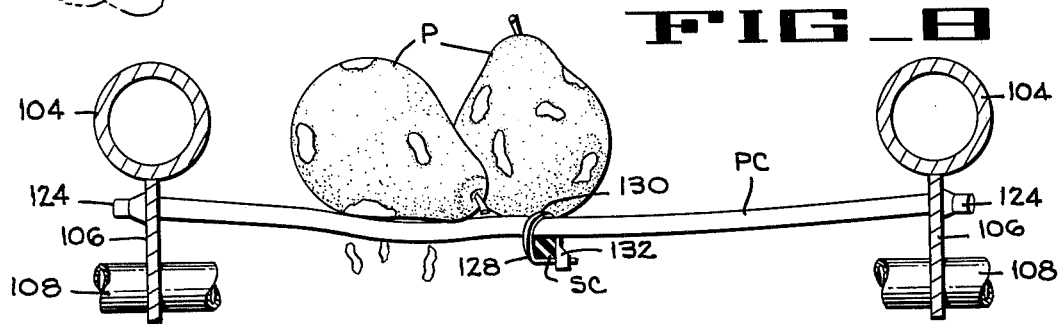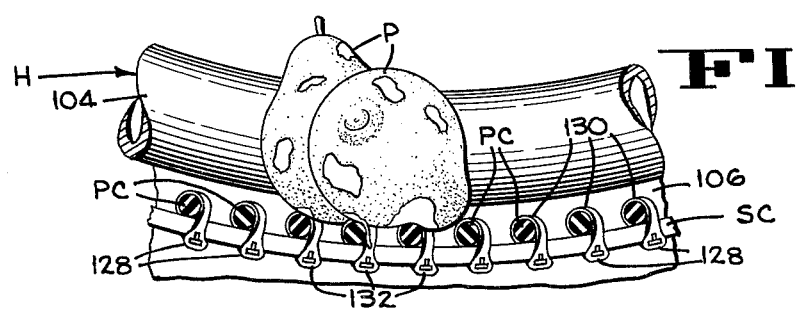

FLEXIBLE CABLE DRY PEELER WITH RUBBER-LIKE CORDS

BACKGROUND OF THE INVENTION

1. Field of the Invention

This invention relates to the peeling of fruits and vegetables and more particularly to the dry peeling of fleshy fruits such as pears, drupes, apples, tomatoes, etc.

2. Description of the Prior Art

The Hirahara Pat. No. 3,854,395, issued on Dec. 17, 1974, discloses a flexible dry peeler formed as a rotary cylindrical cage having an abradant surface of axially extending, circumferentially spaced, parallel braided stainless steel wire cables stretched between axially spaced rings. The wire cage is rotated to tumble the product and the product is propelled through the cage by a differentially rotating helical screw of the type resembling an auger.

My earlier U.S. Pat. No. 3,602,282, issued on Aug. 31, 1971, discloses a device for peeling caustically treated pears wherein the peeler comprises a downwardly inclined net formed of nylon cords woven into squares on one and one-half inch centers, wherein the framework of the netting is vibrated mechanically. Neither of the peeling operations disclosed in my above identified patents require flushing the abradant surface with water during the peeling operation.

The patent to Wilhelm U.S. Pat. No. 3,480,057, Nov. 25, 1969, discloses a dry peeler for fruits and vegetables having a rotatable hollow, cylindrical, inclined peeling section formed of double crimp black iron wire, punched sheets, or expanded metal. Opposed tumbling bars are mounted inside the dry peeling section. After leaving the dry peeling section of the apparatus, the fruit passes through a cylindrical washer comprising a cage of longitudinally extending angle irons, spaced one eighth inch apart, that mount an internal conveyor screw. The washer forms an extension of the dry peeling section of the apparatus and contains a water spray for final washing of the fruit.

SUMMARY OF THE INVENTION

The apparatus of the present invention can be considered to be an improvement over the flexible cable dry peeler of the earlier mentioned U.S. Pat. No. 3,854,395, assigned to FMC Corporation. The dry peeler disclosed in this patent will not clog with peels, has a high tonnage output, and even when peeling hard fruit or vegetables, such as potatoes, has a relatively high yield of usable product. However, caustically treated, fleshy fruits such as pears, apples, drupes, etc. may suffer a loss of yield if tumbled against the braided wire cables employed as the abrading members for dry peeling, because the wire cables cut into and remove part of the fruit flesh, along with the skins. Also, the independently driven conveyor that extends through the separately driven cage of braided wire cables may impair, to some degree, the tumbling action of the fruit during peeling, and does add to the cost, weight and power requirements for operating the entire apparatus.

The dry peeler of the present invention will peel caustically treated fleshy fruit without any substantial loss of yield, i.e., the peeling action is carried out without significantly cutting into and damaging or removing the flesh of the fruit.

This is accomplished by employing a rotary cylindrical cage having a peeling surface formed of axially extending, circumferentially spaced, tensioned flexible members which are supported between adjacent flights or convolutions of a conveying helix resembling a spring, in contrast to the auger type of conveying helix. The flexible tension members have a large enough diameter and are formed of a composition that is soft enough so that they do not remove any significant amount of flesh and hence do not significantly reduce the yield during the dry peeling process. Also, the flexible tension members are sufficiently flexible and resilient during their operation so that the tumbling action of the fruit during rotation of the peeler flexes and vibrates the peeling members sufficiently to cause the members to be self-cleaning, and the peels fall off the members and drop from and between them into a receiver without the use of flushing water.

In regard to the vibration of the flexible tension members, those which are later disclosed herein have been observed to continue vibrating as they pass over the upper sector of their orbit, and it is believed that they resonate at some natural frequency. This vibration is desirable because the peeling members thus continue to fling off any skin particles until they again arrive at their fruit supporting positions. The tensioned peeling members are formed of a rubber-like material, and have been found to be of particular usefulness in removing the peels of fleshy fruit without removing much of the flesh of the fruit, thus maintaining a high yield of edible and saleable product.

The peeling members, sometimes referred to hereinafter as mono-cords, are preferably molded of neoprene in a single length about ⅜ inch in diameter, having a Durometer hardness of 55–60, Scale A. The peeling members are initially stretched about 20% on installation, and have been found to stretch as much as nearly 20% over their installed length in operation, yet have an unexpectedly long life during actual production operation, and are also inexpensive to replace. In the embodiment of the invention to be described, those portions of the tension members which are active in the peeling operation are each about 11½ inches long (uninstalled) and an enlarged retaining head portion is molded on each end so that the members can be stretched to an installed length of about 14 inches, and maintained stretched, between peripheral apertures in adjacent flights of a helical conveyor screw. Thus mounted, the tension members cooperate with the helical screw to form a cylindrical open cage, and the screw flights form internal conveying means for the fruit.

Another feature of the present invention is that a separately driven auger type of conveyor screw, closed from its mounting hub to its periphery as shown in the aforesaid Hirahara U.S. Pat. No. 3,854,395, is not necessary. In the preferred embodiment of the invention, the conveyor screw is formed in the manner of an open, spring-like helix mounted on spokes and having longitudinally extending tie rods. Thus, the screw and the cooperating tension members connecting the screw flights form the basic cage-like framework for the peeler. This construction has the advantage in that the axial flow and the falling action of the tumbling fruit is relatively unimpeded. Accordingly, the tumbling action is efficient because the conveyor itself is radially shallow, and the central portion of the peeler is occupied by a plain axle or shaft that is only connected to the periphery of the peeler by radial spokes. From the standpoint of initial cost and operational maintenance, another advantage is that the helical conveyor directly mounts the tension members fastened between the convolutions or flights of the helical screw.

In order to minimize damage to relatively fragile fruit during tumbling, the conveyor helix is formed of a round or smooth cross-sectional member, such as a helically wound tube, to which is welded a continuous radially outwardly projecting flange. Longitudinal tie rods connect the outer portions of the flange, and the tensioned, rubber-like peeling cables are stretched between adjacent flights of the flange radially inside of the tie rods and radially outside of the helical tube. In the embodiment to be described, the helical flange is drilled to form a row of cable mounting apertures. Adjacent apertures are interspaced by one half the spacing of the resilient, tensioned mono-cords in any given flight, and the cords extend alternately in opposite directions from the helical flange. By forming the helix with a uniform pitch and by staggering the cable mountings, it is thus possible to use molded mono-cards of only one length. The rounded helical conveyor tube provides a smooth, non-damaging conveying action inside the cage formed of the tensioned, resilient cables, and the cords provide a soft cradle for the fruit. In operation, the cords flex and have a vibratory action while they abrade the skin particles from the fruit. The peeling cage is rotated at about 20–25 RPM.

The efficiency of the peeling action of the resilient, tensioned cables operating on fleshy fruit such as caustically treated pears or the like, is such that in a peeler about 10 feet long and about 30 inches in inside diameter, approximately 4½ tons of fruit can be peeled per hour. About 90% of the peels are removed during travel of the fruit through the first half of the cylindrical peeler assembly. In this half of the peeler, no water is used or required, and the peels are collected as a moist mass in a subjacent bin.

The fruit may be brought to a completely peeled, rinsed and ready-to-can condition in the second half of the peeler (except that fruit such as pears must be inspected, trimmed, stemmed and cored) by using a spray rinse therein so that the remaining small percent of the peels and the caustic solution are rinsed away. The rinse water volume is relatively small—about 12 gallons per minute. Thus, the percentage of wet waste which must be disposed is of unusually small. The other waste (dry peelings from the first section of the peeler) need not be disposed of in the sewer lines, but is dry enough to transport to a dump for burial.

When using the peeler of the present invention, the nose ends of non-spherical fruit, such as pears, do not become jammed or extruded between the tensioned rubber-like cords because the cords are laterally, as well as radially, flexible. This feature, coupled with a relatively unimpeded tumbling action during rotation of the peeler, is such that when the nose portions of pears, for example, penetrate between adjacent cords, those cords readily separate for temporarily receiving the nose portions of the fruit, yet the fruit will not fall out and is readily dislodged by gravity and by the impacts of other fruit that occur during the tumbling action. The tensioned cords purposely are designed to allow the nose portions of pears to partially protrude between adjacent cords so that the necks of the pears are abraded to remove the skin. Thus, the cords abrade, but do not firmly grip and retain the nose end of the fruit, and the cords peel, but do not damage the flesh of the fruit.

The inlet end and the outlet end of the peeler each include a mounting ring for the parallel longitudinal tie rods which connect to the helical screw flights, which ring lies in a radial plane. Accordingly, at each end of the peeler, the spacing between the helical screw flight and the associated end ring decreases from the nominal spacing between the flights to zero where the flight is attached to the end ring. If these wedge-shaped gaps at the end portions of the peeler were fitted with rubber-like cords, as is the case along the major portion of the conveyor flight, the cords would have to be progressively shorter. This would require numerous individual molds for the group of cords under consideration which would increase the cost of constructing the machine and would complicate its assembly because of the need for selecting cords of different lengths at the end portions of the peeler. However, it has been found that this difficulty can be obviated, without reducing the effectiveness of the peeler, by filling in each of the aforesaid wedge shaped gaps between the end portions of the flights and the end rings by a stainless steel, wedge-shaped, sheet metal segment. This segment extends from the point of connection of the conveyor flight to an end ring, to a point on the flight where the flight is spaced from an end ring by a distance equal to the pitch of the helix. Thus, the cords, all of uniform length, are installed between the wide portion of the sheet metal segment at one end of the peeler to the wide portion of a complementary sheet metal segment that is fitted at the other end of the peeler.

In a dry peeling machine constructed in accordance with the example set forth, where the output is about 4½ tons per hour, the power requirements are unusually low because only about 75 pounds of fruit are in transit in the peeler at any given time. In fact, it has been found that an electric motor of only about one half horsepower is adequate to drive the peeler. It has also been found that the dry peeling half of the peeler is so effective that the rinsing action applied to the fruit along the second half of the peeler will completely prepare the fruit for packing, after the usual visual inspection and manual trimming, without additional rinsing means for the peeled fruit after it leaves the peeler cage. In the case of pears, they must first be stemmed and cored before the packing operation, but whole fruit such as tomatoes, apricots and peaches may be directly packed. Usually, the cannery will collect and hold a large lot of peeled fruit so that the packing operation may be uninterrupted for a long production run.

A further feature of the present invention is that the abrading action on the fruit carried out by the tensioned, rubber-like mono-cords may be preset, according to the particular fruit to be peeled, so that the abrading action will be at any desired degree from gentle to harsh. For this purpose, a continuous neoprene stabilizing cord is helically wrapped around the peeling cage to lie in centered relation over the tensioned peeling cords. At selected junctures, where the continuous stabilizing cord bisects the peeling cords, the two cords are secured together with a conventional plastic electrical tie which is commercially available for bundling electrical wires.

The most gentle abrading action is obtained with the continuous stabilizing cord fastened to the outside of each tensioned peeling cord, because the midportions of the mono-cords are particularly supported by the stabilizing cord and thus the fruit supporting cradle formed by the inside surfaces of the peeling cords maintains its generally cylindrical shape and localized offset, displacement or staggering of the peeling cords is minimized. To obtain a greater degree of abrading action, the continuous stabilizing cord is threaded inside and outside of the tension peeling cords, during installation, and tied to each peeling cord. Thus, some adjacent peeling cords are relatively displaced radially by the continuous stabilizing cord, and this radial offsetting of the peeling cords provides a more aggressive abrading surface for the fruit.

For example, if the stabilizing cable passes outside of two peeling cords and inside of the next cord — continuously around the peeling cage — a single peeling cord will be displaced outwardly relative to adjacent pairs of cords and this has the effect of providing a rougher or more aggressive peeling surface. A still more aggressive peeling surface can be obtained by threading the stabilizing cable inside of two peeling cords and outside of a single cord, because this will displace the single peeling cable relatively inwardly. Since the stabilizing cable can displace selected peeling cords either inward or outward, the abrading action on the fruit can be modified to suit the different conditions necessary for peeling a wide variety of fruit.

The manner in which the aforesaid advantages of the invention are attained will be apparent from the detailed description of the preferred embodiment that follows:

BRIEF DESCRIPTION OF THE DRAWINGS

FIG. 1 is a diagrammatic side elevation of a fruit peeling system including a lye applicator and the dry peeling apparatus of the present invention.

FIG. 2 is a vertical section of the inlet end half of the dry peeling apparatus shown in FIG. 1, and in conjunction with FIG. 3 illustrates the entire dry peeler.

FIG. 3 is a companion vertical section to FIG. 2.

FIG. 4 is a vertical section taken along lines 4—4 on FIG. 2.

FIG. 5 is an enlarged fragmentary perspective of the peeling cage of the dry peeling apparatus.

FIG. 5A is an enlarged fragmentary section showing the typical mechanical tie between the juncture of a helically wound stabilizing cord and a longitudinal peeling cord.

FIGS. 5B and 5C are schematic transverse sections illustrating different possible orientations of the peeling cords with the stabilizing cord.

FIG. 6 is a greatly enlarged detail of the end portion of an installed peeling cord.

FIG. 7 is a fragmentary enlarged plan of the interior of a tumbling cage, with tumbling fruit therein.

FIG. 8 is a diagrammatic longitudinal section of the apparatus shown in FIG. 7.

FIG. 9 is a diagrammatic transverse section of the apparatus shown in FIG. 7.

DESCRIPTION OF A PREFERRED EMBODIMENT

The dry peeling machine 20 of the present invention is shown in FIG. 1 in a typical installation. The fruit is fed from a shuffle feeder 22 into a lye treating unit 24 where the fruit is subjected to a lye treatment to soften the skins. A holding unit 28 then conveys the lye treated fruit, allowing a predetermined time for the lye to act upon the fruit, to a steamer valve 30 in which pressurized steam activates the lye before the fruit is discharged to atmospheric pressure and into a dry peeling machine 20. The lye treating unit 24 is constructed and operates in the manner disclosed in the U.S. Pat. No. 3,246,677 issued to Hickey et al. on Apr. 19, 1966, and assigned to the assignee of the present invention. Although the overall combination of structural elements shown in FIG. 1 produces improved and beneficial results for dry peeling a variety of different fruit, the dry peeling machine 20 has independent utility in similar processing systems, for peeling lye-treated fruit, with similar attendant advangtages in peeling and rinsing fragile fruit with relatively little water, ready for coring, stemming and packing with only a small amount of wet waste.

With more specific reference to FIG. 1, fruit, such as pears P, enter the lye treating unit 24 from the shuffle feeder 22 and enter an endless series of trough-shaped conveying buckets 32 that are hinged together at 34. The end portions of the buckets are connected to driven endless chains, not shown, which extend along the dotted line path 35 and are trained around lateral pairs of sprockets 36, 38, 40 and 42, the latter of which are powered by a drive motor M and power train 43 at preselected speed. The loaded buckets at the shuffle feeder 22 descend around the sprockets 36, and begin to invert and slide across a wall 44 which curves around the sprockets 36 and 38 to retain the fruit in the buckets. Intermediate the sprockets 36 and 39, the wall 44 extends through a heated lye bath 46, the surface of which is indicated at the level L. Thus, the buoyant pears are pushed along the wall 44 by the inverted buckets, and are completely wetted with heated caustic solution for about 3 minutes at 155° F. The buckets are conveyed over the sprockets 38 in upright position to be carried around the sprockets 40 and slide around an arcuate shield 48. As the buckets rise above the centers of the sprockets 40, the shield 48 prevents the pears from dropping out until, near the upper end of the shield 48, the pears are free to gravitate from the pockets. The pears then slide down a discharge chute 50 between transverse pusher flights 52 on an elevator belt 54. The elevator belt is a component of the holding unit 28 wherein the lye on the pears acts thereon for a predetermined time until the pears, following the dotted line path 56, pass over a pair of upper sprockets 58 and drop into pockets 60 of the steamer valve 30 to follow the circular dotted path 62.

In order to activate the lye on the pears, the pockets of the steamer valve 30 are supplied with steam under pressure. In the case of pears, the steam pressure may be about 45 psi absolute, thus heating the lye-treated pear skins to about 275° F. After steaming, a large percentage of the skin on each pear has either disintegrated and dropped off, or is loosened, ready to drop off.

As the fruit in the steamer valve moves past bottom center, each pocket of the valve indexes with a covered flume 64 and is discharged from the steamer valve 30 into the flume at atmospheric pressure. This sudden pressure drop causes some skin fragments to flash from the fruit, so the covered portion of the flume must extend at least into the dry peeling machine 20 to prevent the fragments from escaping. The flume 64 is open at its lower end, and terminates close to the inside bottom surface of a tumbling cage C of the dry peeler assembly 20. As previously mentioned, the lye treating unit 24 is more fully disclosed in Hickey et al. U.S. Pat.

No. 3,246,677, but for the present purpose, further details thereof are not believed to be necessary.

THE DRY PEELING MACHINE

Referring now to FIGS. 1–3, the tumbling cage C of the dry peeling machine 20 of the present invention is provided with a dry peeling section A which forms the upstream half of the machine, and a rinsing and peeling section B which forms the downstream half of the machine. A helical screw flight H inside the tumbling cage propels the fruit through the tumbling cage from the inlet flume 64 to a discharge lip 65 (FIG. 3) which delivers the peeled and rinsed fruit onto a takeaway conveyor 66 (FIG. 1). The machine is floor-supported by a fabricated frame that includes tubular upright legs 68, connected by transverse tubes 70 (FIG. 2) and 72 (FIG. 3), and longitudinal tubes 74 connecting the upper end portions of the legs 68. At a lower elevation, frame tubes 75 which parallel the upper frame tubes 74 are also connected to the legs 68. Near the longitudinal center of the dry peeling machine 20 (FIGS. 1, 2 and 4) vertical tubular braces 76 are welded to the upper and lower frame tubes 74 and 75 at each side of the machine, and the various frame tubes define a rectangular framework for the tumbling cage C. The upper frame tubes 74 form liquid supply conduits fed by inlet conduits 77 (FIG. 2) for rinsing sprays which are directed inwardly from spray nozzles 78 (FIG. 3) in the downstream rinsing and peeling section B of the peeling machine. The dry peeling section A does not require any water spray. As shown in FIGS. 1 and 4, both sides of the dry peeling machine are enclosed by doors 79 which are provided with hinges 79a and latches 79b. Sheet metal end walls 79c (FIG. 2) and 79d (FIGS. 3 and 4) enclose the inlet and outlet ends of the dry peeling machine 20.

A discharge chute D (FIGS. 1 and 2) underlies the peeling section A for directing the removed peels into a storage bin SB which is periodically removed and emptied with the aid of a fork lift. The rinsing and peeling section B overlies a funnel F which collects the rinse water and peels for disposal.

The tumbling cage C (FIGS. 2 and 3) includes a central tubular driveshaft 80 which is provided with stub shafts 82 and 84 that are mounted in end bearings 86 and 88. The bearings are suspended from the transverse frame tubes 70 and 72, and the stub shaft 84 is connected by a belt and pulley drive train 90 to the output shaft 92 of a variable speed drive unit 94 driven by a motor ml. The motor and drive unit are mounted on a shelf 96 which is secured cantilever-fashion to the frame tube 72 and reinforced by a pair of gussets 97. A spray shield, not shown, encloses the motor ml and variable speed drive unit 94 from the mist developed by the water sprays from the nozzles 78 in the peeling section B of the tumbling cage C.

At spaced points along the driveshaft 80, groups of longitudinally spaced radial spokes 98, 100 and 102, with the four spokes of each group angularly offset from the adjacent groups of spokes, support a helically wound, continuous tube 104 which forms the helical screw conveyor H that propels the fruit through the tumbling cage C. Spokes 98 (FIG. 2) and 102 (FIG. 3) are aligned, and hence the spokes 102 are hidden in FIG. 4. To prevent damage to the fruit conveyed through the tumbling cage C, the tube 104 has a smooth cross-section, which section is preferably circular. For a purpose to be presently described, the helical screw conveyor H has a uniform pitch.

A flat, continuous helical flange 106, is welded to, and projects from the central outer surface of the helical tube 104. Accordingly, the helical flange 106 also has a uniform pitch, and the distance between any two convolutions, as will be presently described, is also uniform. As shown in FIGS. 3 and 4, longitudinal tie rod tubes 108 extend through aligned apertures in the convolutions of the flange 106, and are welded thereto to rigidify the tumbling cage C.

The helical flange 106, inwardly of the tie rods 108 is provided with a series of uniformly spaced cable mounting apertures 109 (FIG. 4) in which tensioned, rubber-like peeling cords PC are mounted. Before describing the peeling cords, it should be noted that their mounting apertures 109 begin at the second convolution of the helical screw 104 from the inlet end of the peeling machine, and stop at the beginning of the last convolution at the outlet end of the machine. The helical flange 106, however, extends between an end ring 110 (FIG. 2) and an end ring 112 (FIG. 3), both rings being secured to the ends of the tie rods 108, to the ends of the helical screw 104, and to the ends of the flange 106. The apertures are circumferentially located such that they are longitudinally aligned between any two adjacent convolutions of the helical flange 106, but the end rings 110 and 112 are not apertured. In order that the peeling cords PC may all be of uniform length, there are no cords stretched between the the first and last convolutions of the helix and the associated end ring, because if such cords were installed they would be of progressively different lengths. Accordingly, the first convolution of the helical tube 104 (FIG. 2) at the inlet end of the peeling machine is provided with a circumferential wall segment 114 which is secured to the tube 104 and to the end ring 110. The end ring 112 (FIG. 3) at the outlet end of the peeling machine is similarly secured to a wall segment 116 extending circumferentially around the last convolution of the helical screw 104. Both wall segments 114 and 116 have a developed profile which is substantially wedge-shaped, and the segments are preferably formed of stainless steel sheet. Thus, by blanking off the first and last convolutions of the helical tube 104 and the helical flange 106 which mounts the peeling cords PC, all of the peeling cords can be of uniform length.

FIG. 6 shows a greatly enlarged end portion of one of the peeling cords PC mounted in an aperture 109 of the helical cable mounting flange 106. Each peeling cord is homogeneous, and is molded of neoprene (or a similar rubber-like material which can be stretched to about 1½ times its length and will rebound to its initial length rapidly and with force) having a durometer hardness of 55–60, Scale A. At each end, the peeling cord is provided with a radial retaining flange 120 which merges into a tapered camming surface 122; the free end of the peeling cord is formed to provide a gripping end which is circular. Each cord PC is installed by pushing the gripping end 124 through the aperture 109 and then gripping and pulling said end with pliers. Camming surface 122, flange 120, and adjacent portions of the cord are thus resiliently deformed until they emerge on the other side of the flange 106, at which time the cord end appears as shown in FIG. 6 and is locked in place.

In a preferred embodiment of the present invention, the peeling cords are ⅝ of an inch in diameter, and have a free (uninstalled) length between the flanges 120 of about 11½ inches, and an installed (tensioned) length of about 14 3/16 inches. The tension in an installed cord provides a pull on the helix flanges of about 14 pounds.

Referring to FIG. 5, the continuous helical flange 106 is drilled with the peeling cord mounting apertures 109 on ½ inch centers, but the peeling cords PC in any one convolution are mounted in every other aperture and the intermediate apertures mount the peeling cords for the adjacent convolutions. Thus, the portion of the flange 106 of the helix H that runs between the second and the second last convolution mount peeling cords that extend in alternately opposite directions from the flange. The effect is that the cords lie on 1 inch centers along the helix between the entry and exit segments 114 and 116 and the gap between adjacent peeling cords (before the peeling cords are stretched by the tumbling fruit during operation of the dry peeler 20) is ⅝ of an inch.

In order to prevent excessive lateral separation of the flexible peeling cords PC that might allow fruit to fall out of the tumbling cage C, a continuous stabilizing cord SC is helically wrapped around the tumbling cage to intersect the peeling cords PC at mid-length. The stabilizing cord is formed of ⅜ inch square neoprene of 55–60 durometer, Scale A. Every juncture of the stabilizing cord with a peeling cord is secured with a plastic tie strap 128 (FIG. 5A) which is a conventional electrical tie used for bundling electrical wires. The particular tie illustrated is available from the Thomas and Betts Company of Elizabeth, New Jersey, part No. TY-525M, and comprises a flat, thin plastic strap 130 with an integrally molded apertured end 132. The tie is installed diagonally over each juncture of the stabilizing cord SC with a peeling cord PC, as shown in FIG. 5, with all of the ties oriented in the same direction for the reason that uniform orientation has been found to be more stable in operation than are randomly oriented ties. The free end of the strap 130 is pulled through the molded apertured end 132, and a stainless steel jaw in said end grips and locks the strap in place; the excess strap is cut off and the cords SC and PC are permanently and securely tied together.

As previously mentioned, a feature of the peeling machine 20 is that the interior fruit abrading surface formed by the peeling cables PC can be formed to provide a peeling or abrading surface of various degrees of aggressiveness selected to suit the particular fruit being processed. For example, the desired aggressiveness of the abrading action will be of smaller magnitude for peeling peaches, than for peeling pears. In order to control the abrading action, the stabilizing cord SC is installed either outside of all the peeling cords PC, as illustrated in FIG. 5, or is threaded outside of some of the peeling cords, and inside of others. The least aggressive abrading action is obtained when the stabilizing cord SC passes outside of all the peeling cords as in FIG. 5, thus presenting the smoothest interior abrading surface to the fruit tumbling and being advanced by the helical screw conveyor H through the tumbling cage C.

FIGS. 5B and 5C show two of the possible ways in which the stabilizing cord SC can be threaded inside and outside the peeling cords PC. The most aggressive abrasion of the fruit results from the orientation of cords SC and PC shown in FIG. 5C, in which the stabilizing cord SC passes inside of every other peeling cord PC. The line 133 shows the nominal or mean centerline of the peeling cords PC when the stabilizing cord is installed outside of every peeling cord. Thus, with the arrangement shown in FIG. 5C, the stabilizing cord SC displaces the peeling cords PC radially relative to one another. The cords are displaced alternately toward the inside of the tumbling cage C, and toward the outside, whereby the inside contour of the tumbling cage is, in effect, roughened or rendered more aggressive. The fruit in the tumbling cage is thus more aggressively peeled or abraded by the peeling cords than is the case when the stabilizing cord passes outside every peeling cord.

In FIG. 5B, every third peeling cord PC lies inside of the stabilizing cord SC and two cords are on the outside. This cord arrangement provides a less aggressive peeling or abrading action on the fruit than either of the cord arrangements shown in FIG. 5 or FIG. 5C. Other possible combinations, not illustrated, give the following peeling results:

| STABILIZING CORD | THE RESULTING PEELING ACTION |
| --- | --- |
| Outside of two peeling cords, and inside of one | A moderate peeling action |
| Outside of three peeling cords, and inside one | A mild peeling action |
| Outside of four peeling cords, and inside of one | A very mild peeling action |

As previously mentioned, in each case the stabilizing cord SC is tied to every peeling cord PC.

OPERATION

The operation of the dry peeler of the present invention will now be briefly summarized, although it has been explained in some detail previously.

Caustically treated fruit, such as pears in the example being described, are fed into one end of the peeling cage as previously described in detail and which description need not be repeated. The peeling cage is rotated at about 20–25 rpm and as a result of this rotation, the pears are carried partially up the rising side of the cage by the peeling cables PC but before they reach the top of the cage, they fall back down onto the cage or on the pears at the bottom thereof, thereby providing a tumbling action on the fruit. The pears are distributed and fed along the cage without damage by the smooth tubular helical tube 104 (FIG. 8); this feeding action not only propels the fruit through the peeler but assists in distributing the fruit so that all the pears are subjected to the peeling action of the rubber-like peeling cords PC.

As seen in FIG. 8, the rubber-like peeling cords are locally deflected by the pears, which deflection action is augmented if other pears (not shown) are supported by pears that are directly supported by the peeling cords. This local deflection causes the cords to conform somewhat to the contour of the fruit and increases the efficiency of the peeling action. If the noses of pears, for example, happen to be forced between adjacent peeling cords, the gripping action of these cords on the noses is insufficient to prevent advance of such pears along the cage by the helix. On the other hand this action assists in peeling the noses of non-spheroidal fruit, such as pears.

FIG. 7 illustrates how the cords can also be laterally displaced by localized action thereon by the fruit.

The first section A of the peeler receives no water wash and about 95% of the peels removed in this section drop out into the container below. The second section B of the peeler can be considered a clean-up section wherein the small fraction of the peels that remain on the fruit after the dry peeling section A are removed. Some water spray is provided for the fruit during its traverse of the second section B of the peeler, but since almost all of the peels have been removed by the time the fruit reaches the spray section, the slurry flowing down through the peeler at section B contains a very small percentage of peels and this water can be disposed of by a sewer system or any other conventional manner. The peels that drop off during the dry peeling section A are only wet by whatever caustic remains on the peels after the holding section previously described and these peels can be collected and trucked to a suitable disposal location in the form of a substantially dry paste or sludge.

As previously mentioned, a feature of the present invention is a self-cleaning action of the mono-cords which is provided because during the tumbling action the mono-cords are set into a low frequency vibration of substantial amplitude and the cords continue to vibrate between the time when the pears drop off the cords to the time when the cords are again brought into engagement with pears near a lower portion of the cage. Thus, peels adhering to the cords that would otherwise be carried up and around the cage are shaken off the cords. The presence of the stabilizing cord SC, tied to the mid-portion of each cord, renders the mode of vibration of the individual cords somewhat complex and makes it difficult to determine the exact frequency of the vibration of the cords when they are not supporting fruit. Also the amplitude of the vibration is difficult to measure during operation, but observation of the cords during operation reveals that the amplitude is substantial enough to be visible without use of a stroboscope. However, in the present embodiment successful and effective operation and vibratory self-cleaning is obtained in a construction whereby the mono-cords PC are formed of such a length and diameter and are stretched to such a degree that the natural frequency of vibration of the cords when installed under tension, and when connected to a stabilizing cable SC, is in the range of about 45–55 cycles per second. It has been found that mono-cords having this vibratory frequency characteristic when installed in accordance with the present invention, provide the vibratory self-cleaning action previously described.

Although the embodiment of the invention described in detail refers to the peeling of caustically treated pears, it will be understood that the dry peeler of the present invention will be useful in the peeling of other caustically treated fleshy fruit such as drupes, apples, etc.

When employed in the appended claims, the term "rubber-like material" includes natural and synthetic rubber and also includes elastomers which have properties similar to those of natural and synthetic rubbers and which, like rubber, can be stretched repeatedly to about 150% of normal length and will return rapidly and with force to their original state. The term "neoprene" refers to a synthetic rubber-like material which is formed of polymers of chloroprene.

The term "mono-cord", as applied to the rubberlike peeling cords of the present invention, refers to a length of the rubber-like material which is homogeneous along its length, as opposed to a peeling cord made up as a cable of strands of rubber-like material.

Although the best mode contemplated for carrying out the present invention has been herein shown and described, it will be apparent that modification and variation may be made without departing from what is regarded to be the subject matter of the invention.

What we claim is:

1. In an abrading peeler for fruit which has been pre-treated to soften the skin of the fruit, said peeler being of the type comprising a rotatable cage wherein the fruit is tumbled to abrade and remove the skins; and means for rotating said cage; the improvement comprising a driven shaft for rotating the cage, a continuous helical screw for advancing fruit along the cage, said screw, including an external flange, said flange being provided with a circumferential series of spaced transverse apertures, spoke means mounting said helical screw to said driven shaft, a plurality of resilient, tensioned, rubber-like cords extending longitudinally of said screw for peeling the fruit, means for anchoring the ends of each cord in the apertures of spaced convolutions of said screw, and means for feeding fruit into and from the tumbling cage defined by said screw and said cables.

2. A peeler for food products such as fleshy fruits or the like which have been treated to soften their skins for removal, said peeler being of the type that comprises a rotary cage having a peel removal envelope formed of circumferentially spaced generally axially extending flexible tension members, means for mounting said tension members, means for rotating the cage so that said tension members peel the products, means for causing products fed into the cage to move axially along the rotating cage, and means beneath the cage for receiving peels; the improvement wherein said tension members are mono-cords formed of rubber-like material, having smooth surfaces for facilitating their shedding of peels axially spaced, circumferentially disposed mounting means supported along said cage, means for mounting said mono-cords in a stretched condition between axially spaced portions of said mounting means so that said monocords vibrate in response to the tumbling action of the product during cage rotation and shed peels that have been removed from the products, said means for causing the products to move axially along the rotating cage comprises said mounting means for the mono-cords, which mounting means is formed as a helix for moving the product along the cage.

3. The peeler of claim 2, wherein said helix is formed with a row of circumferentially spaced apertures through which said mono-cords pass, the ends of said mono-cords being formed with enlarged mounting heads that retain the mono-cords on said helix.

4. The peeler of claim 2, wherein each end of said helix connects to a ring disposed in a plane that is generally normal to the axis of rotation of said cage, and a curved sheet segment connected between each ring and the adjacent convolution of said helix.

5. The peeler of claim 3, wherein said helix comprises a smooth tubular helical member with a radially outwardly projecting helical flange, the ends of said mono-cords being mounted by said flange, and axially extending tie rods for the helix connected to said flange radially outwardly of said mono-cords.

6. The peeler of claim 5, wherein said helical flange is formed with a row of circumferentially spaced apertures through which said mono-cords pass, the ends of said mono-cords being formed with enlarged mounting heads the retain the mono-cords on said helical flange.

7. The peeler of claim 6, wherein circumferentially adjacent mounting heads are formed on mono-cords that extend in opposite axial directions.

8. The peeler of claim 7, wherein said mono-cords are stretched between adjacent convolutions of said helical flange.

9. The peeler of claim 7, wherein said mono-cords are formed of neoprene.

10. The peeler of claim 9, wherein said mono-cord mounting heads are also formed of neoprene and are molded integrally with the remainder of the mono-cord.

* * * * *

UNITED STATES PATENT OFFICE
CERTIFICATE OF CORRECTION

Patent No. 4,023,477            Dated May 17, 1977

Inventor(s) KATSUJI HIRAHARA et al

It is certified that error appears in the above-identified patent and that said Letters Patent are hereby corrected as shown below:

Col. 1, line 21, change "My earlier" to --The Hirahara--.
Col. 3, line 22, change "mono-cards" to --mono-cords--.
Col. 5, line 1, change "particularly" to --partially--.
Col. 6, line 12, change "advangtages" to --advantages--.

Signed and Sealed this

Ninth Day of October 1979

[SEAL]

Attest:

RUTH C. MASON
Attesting Officer

LUTRELLE F. PARKER
Acting Commissioner of Patents and Trademark